(12) United States Patent
Chung et al.

(10) Patent No.: US 12,073,165 B2
(45) Date of Patent: Aug. 27, 2024

(54) STANDARD CELL DESIGN

(71) Applicant: Taiwan Semiconductor Manufacturing Company, Ltd., Hsinchu (TW)

(72) Inventors: Shu-Wei Chung, Taichung (TW); Tung-Heng Hsieh, Hsinchu County (TW); Chung-Hui Chen, HsinChu (TW); Chung-Yi Lin, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 317 days.

(21) Appl. No.: 17/476,615

(22) Filed: Sep. 16, 2021

(65) Prior Publication Data
US 2022/0405457 A1   Dec. 22, 2022

Related U.S. Application Data

(60) Provisional application No. 63/211,738, filed on Jun. 17, 2021.

(51) Int. Cl.
*G06F 30/30* (2020.01)
*G06F 30/323* (2020.01)
*G06F 30/392* (2020.01)
*G06F 30/398* (2020.01)
*G06F 111/20* (2020.01)

(52) U.S. Cl.
CPC .......... *G06F 30/392* (2020.01); *G06F 30/323* (2020.01); *G06F 30/398* (2020.01); *G06F 2111/20* (2020.01)

(58) Field of Classification Search
CPC .... G06F 30/392; G06F 30/323; G06F 30/398; G06F 2111/20; G06F 30/327; G06F 2119/20
See application file for complete search history.

(56) References Cited

U.S. PATENT DOCUMENTS 5,302,864 A * 4/1994 Shinbara .................. H03D 7/00
326/39
9,026,975 B2 * 5/2015 Song ..................... H01L 27/092
716/132

(Continued)

*Primary Examiner* — Jack Chiang
*Assistant Examiner* — Brandon Bowers
(74) *Attorney, Agent, or Firm* — HAYNES AND BOONE, LLP

(57) ABSTRACT

An analog standard cell is provided. An analog standard cell according to the present disclosure includes a first active region and a second active region extending along a first direction, and a plurality of conductive lines in a first metal layer over the first active region and the second active region. The plurality of conductive lines includes a first conductive line and a second conductive line disposed directly over the first active region, a third conductive line and a fourth conductive line disposed directly over the second active region, a middle conductive line disposed between the second conductive line and the third conductive line, a first power line spaced apart from the middle conductive line by the first conductive line and the second conductive line, and a second power line spaced apart from the middle conductive line by the third conductive line and the fourth conductive line.

20 Claims, 12 Drawing Sheets

(56) References Cited

U.S. PATENT DOCUMENTS

| | | | |
|---|---|---|---|
| 9,954,029 B2 * | 4/2018 | Tanaka | H10B 61/22 |
| 2013/0042216 A1 * | 2/2013 | Loh | G06F 30/373 |
| | | | 716/119 |
| 2019/0211475 A1 * | 7/2019 | Ito | C12N 5/0606 |
| 2019/0286783 A1 * | 9/2019 | Yang | G06F 30/398 |
| 2021/0118801 A1 | 4/2021 | Wang et al. | |

* cited by examiner

STANDARD CELL DESIGN

PRIORITY DATA

This application claims priority to U.S. Provisional Patent Application Ser. No. 63/211,738, filed Jun. 17, 2021, the entire disclosure of which is hereby incorporated herein by reference.

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs.

In semiconductor design, standard cell methodology has been widely used to design digital circuits that process discrete signals. While the convenience of standard cell methodology is appealing to analog circuit designers, the industry has faced several challenges in applying the standard cell methodology to analog circuits that process continuous signals. In some examples, the analog standard cells may have different cell heights than digital standard cells. In other examples, while the analog standard cells and digital standard cells have similar cell heights, they may have different feature sizes. Additionally, resistive-capacitive (RC) delay plays an important role in semiconductor circuit performance as the scaling-down trend continues. While existing analog standard cell designs are generally adequate for their intended purposes, they are not satisfactory in all aspects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
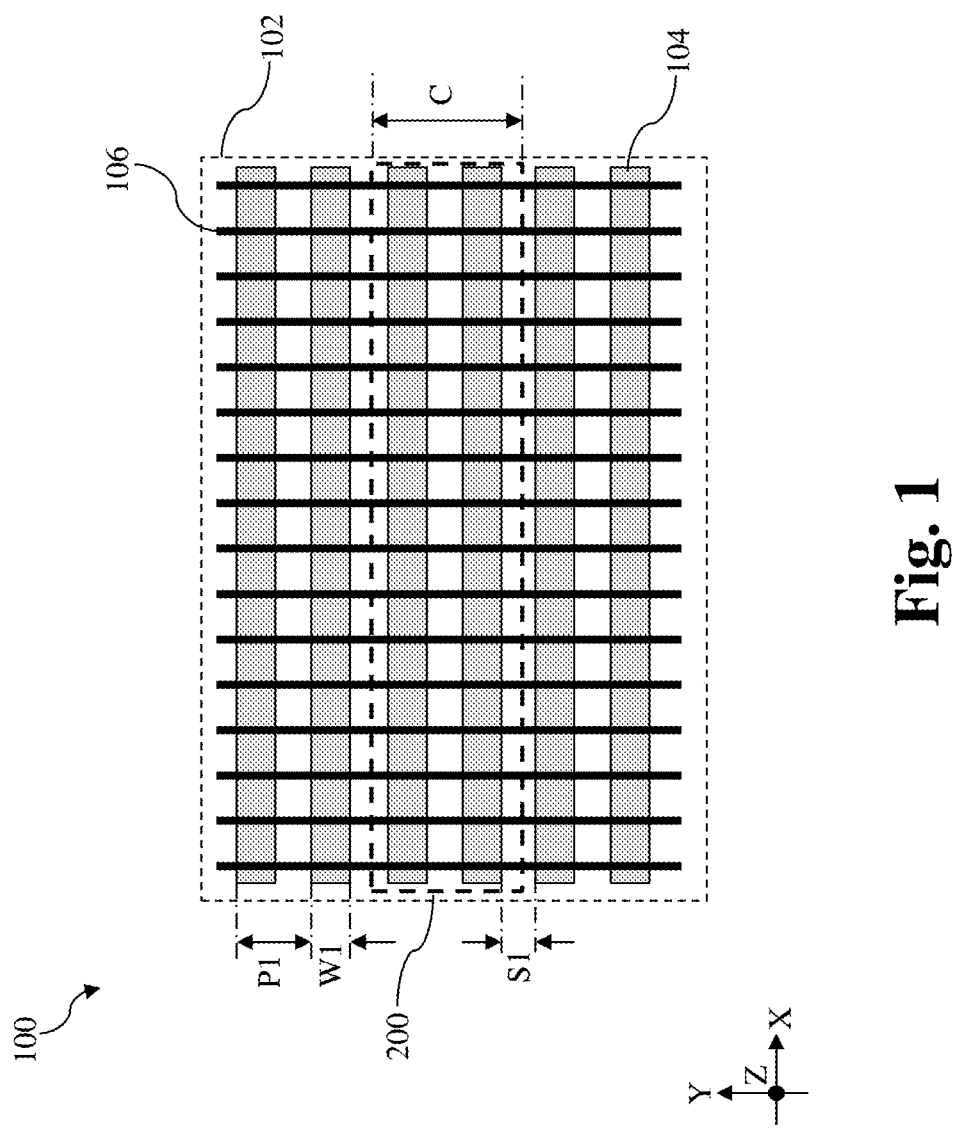
FIG. 1 illustrates a top layout view of a semiconductor workpiece according to various aspects of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, when a number or a range of numbers is described with "about," "approximate," and the like, the term is intended to encompass numbers that are within a reasonable range considering variations that inherently arise during manufacturing as understood by one of ordinary skill in the art. For example, the number or range of numbers encompasses a reasonable range including the number described, such as within +/−10% of the number described, based on known manufacturing tolerances associated with manufacturing a feature having a characteristic associated with the number. For example, a material layer having a thickness of "about 5 nm" can encompass a dimension range from 4.25 nm to 5.75 nm where manufacturing tolerances associated with depositing the material layer are known to be +/−15% by one of ordinary skill in the art. Still further, the present disclosure may repeat reference numerals and/or letters in the various examples. This repetition is for the purpose of simplicity and clarity and does not in itself dictate a relationship between the various embodiments and/or configurations discussed.

Standard cell methodology has been used to lay out a physical design of an integrated circuit. A digital standard cell may include a few transistors to perform one or more logic gate functions, such as AND, OR, XOR, XNOR, NAND, NOR, inverter, or alike. When interconnected by an interconnect structure, multiple digital standard cells may perform complex logic functions and operations. When designing a digital circuit, one group of designers may focus on the high-level logic function design and another group of designers may implement the physical design by mapping the logic functions in the logic function design to the digital standard cells and placing them in a layout. With use of computer-aided design (CAD) tools, digital devices having millions or billions of transistors may be designed in days or even shorter period of time.

While digital circuits operate on discrete ones and zeros digital signals to perform complex operations, the actual devices respond to continuously varying stimulus that are dealt with by analog circuits. Because analog circuits may operate on voltages and currents that are greater than those operate digital circuits, analog standard cells tend to include multiple transistors connected in parallel to withstand the higher voltages and currents. The result is a wide variety of analog standard cell designs. Some standard cells share the same cell height with digital standard cells. Some standard cells include a cell height that is equal to multiple cell heights of the digital standard cell. Even when analog standard cells and digital standard cells have the same cell height, analog standard cells may be densely packed features or features that are very different from features in a digital standard cell in terms of dimensions. Packing density and dimensional variation may cause different loading, which may lead to distortions or device defects.

As the scaling down continues, parasitic resistance and parasitic capacitance have become important factors in performance of state-of-the-art semiconductor devices. In some existing technologies, multiple contact vias and conductive lines are formed to perform the same function so as to reduce parasitic resistance. However, having densely packed conductive features may lead to increased parasitic capacitance that may reduce device speed. Amplifiers are among common analog devices. When serving as an amplifier, transistors in an analog standard cell are connected in parallel to serve as an operational transconductance amplifier (OTA). One of the key performance attributes of an amplifier is the operational bandwidth. Because the gain of an amplifier decreases with frequency and an amplifier must have a gain greater than unity (1), a unity gain frequency (UGF) has been regarded as an indicator of an upper limit of an amplifier's operational frequency. It is observed that the UGF of an amplifier is inversely related to gate-source capacitance and gate-drain capacitance. Reduction of parasitic capacitance can lead to improvement of the unity gain frequency of an amplifier.

The present disclosure provides an analog standard cell template that includes a first active region, a second active region, and a first metal layer disposed over the first active region and the second active region. The first metal layer may include a first conductive line, a second conductive line, a third conductive line, a fourth conductive line, a middle conductive line, a first power rail, and a second power rail. The first conductive line and the second conductive line are disposed directly over the first active region. The third conductive line and the fourth conductive line are disposed directly over the second active region. The middle conductive line is disposed between the second conductive line and the third conductive line. The first power rail is spaced apart from the middle conductive line by the first conductive line and the second conductive line. The second power rail is spaced apart from the middle conductive line by the third conductive line and the fourth conductive line. The first and second power rails are wider than the other conductive lines. The analog standard cell template may further include a plurality of gate structures. At least one of the gate structures is coupled to the middle conductive line by a gate contact via. Analog standard cells generated using the analog standard cell template of the present disclosure provide improved performance and fast switching.

Reference is first made to FIG. 1, which includes a top layout view of a workpiece 100. The workpiece 100 includes a substrate 102, a plurality of active regions 104 extending along the X direction, and a plurality of gate structures 106 extending along the Y direction. As shown in FIG. 1, the active regions 104 are disposed at a first pitch P1, with adjacent active regions 104 spaced apart by a first spacing S1. Each of the active regions 104 has a first width W1 along the Y direction. In some embodiments, the first pitch P1 may be between about 40 nm and about 160 nm, the first spacing S1 may be between about 30 nm and about 80 nm, and the first width W1 may be between about 10 nm and about 80 nm. The first pitch P1 may be a sum of the first width W1 and the first spacing S1.

In some embodiments, the substrate 102 may be a semiconductor substrate such as a silicon (Si) substrate. The substrate 102 may include various doping configurations depending on design requirements as is known in the art. In embodiments where the semiconductor device is p-type, an n-type doping profile (i.e., an n-type well or n-well) may be formed on the substrate 102. In some implementations, the n-type dopant for forming the n-type well may include phosphorus (P) or arsenide (As). In embodiments where the semiconductor device is n-type, a p-type doping profile (i.e., a p-type well or p-well) may be formed on the substrate 102. In some implementations, the n-type dopant for forming the p-type well may include boron (B) or boron difluoride ($BF_2$). The suitable doping techniques may include ion implantation of dopants and/or diffusion processes. The substrate 102 may also include other semiconductors such as germanium (Ge), silicon carbide (SiC), silicon germanium (SiGe), or diamond. Alternatively, the substrate 102 may include a compound semiconductor and/or an alloy semiconductor. Further, the substrate 102 may optionally include an epitaxial layer (epi-layer), may be strained for performance enhancement, may include a silicon-on-insulator (SOI) or a germanium-on-insulator (GeOI) structure, and/or may have other suitable enhancement features.

In the depicted embodiments, each of the active regions 104 includes a vertical stack of channel members or nanostructures that may resemble wires or sheets. For that reasons, the nanostructures may be referred to as nanowires or nanosheets. In the depicted embodiments, the nanostructures in the active regions 104 may include silicon (Si). Because the gate structures 106 wraps around each of the nanostructures in the active regions 104, the resulting transistors may be referred to multi-bridge-channel (MBC) transistors or gate-all-around (GAA) transistors. In some alternative embodiments not explicitly shown in the figures, each of the active regions 104 includes a fin-like semiconductor structure that are formed of semiconductor materials such as silicon, silicon germanium, germanium, III-V semiconductor materials, or the like. In these alternative embodiments, the resulting transistors may be referred to as fin-type field effect transistors (finFETs). Both MBC transistors and finFETs are examples of multi-gate devices.

While not explicitly shown in the figures, the gate structures 106 includes a gate dielectric layer and a gate electrode layer over the gate dielectric layer. The gate dielectric layer includes an interfacial layer and a high-K gate dielectric layer. High-K dielectric materials, as used and described herein, include dielectric materials having a high dielectric constant, for example, greater than that of thermal silicon oxide (~3.9). The interfacial layer may include a dielectric material such as silicon oxide, hafnium silicate, or silicon oxynitride. The interfacial layer may be formed by chemical oxidation, thermal oxidation, atomic layer deposition (ALD), chemical vapor deposition (CVD), and/or other suitable method. The high-K gate dielectric layer may include hafnium oxide. Alternatively, the high-K gate dielectric layer may include other high-K dielectric materials, such as titanium oxide ($TiO_2$), hafnium zirconium oxide (HfZrO), tantalum oxide ($Ta_2O_5$), hafnium silicon oxide ($HfSiO_4$), zirconium oxide ($ZrO_2$), zirconium silicon oxide ($ZrSiO_2$), lanthanum oxide ($La_2O_3$), aluminum oxide ($Al_2O_3$), zirconium oxide (ZrO), yttrium oxide ($Y_2O_3$), $SrTiO_3$ (STO), $BaTiO_3$ (BTO), BaZrO, hafnium lanthanum oxide (HfLaO), lanthanum silicon oxide (LaSiO), aluminum silicon oxide (AlSiO), hafnium tantalum oxide (HfTaO), hafnium titanium oxide (HfTiO), $(Ba,Sr)TiO_3$ (BST), silicon nitride (SiN), silicon oxynitride (SiON), combinations thereof, or other suitable material. The high-K gate dielectric layer may be formed by ALD, physical vapor deposition (PVD), CVD, oxidation, and/or other suitable methods.

The gate electrode layer of the gate structure 106 may include a single layer or alternatively a multi-layer structure, such as various combinations of a metal layer with a selected work function to enhance the device performance (work function metal layer), a liner layer, a wetting layer, an adhesion layer, a metal alloy or a metal silicide. By way of example, the gate electrode layer may include titanium nitride (TiN), titanium aluminum (TiAl), titanium aluminum nitride (TiAlN), tantalum nitride (TaN), tantalum aluminum (TaAl), tantalum aluminum nitride (TaAlN), tantalum aluminum carbide (TaAlC), tantalum carbonitride (TaCN), aluminum (Al), tungsten (W), nickel (Ni), titanium (Ti), ruthenium (Ru), cobalt (Co), platinum (Pt), tantalum carbide (TaC), tantalum silicon nitride (TaSiN), copper (Cu), other refractory metals, or other suitable metal materials or a combination thereof. In various embodiments, the gate electrode layer may be formed by ALD, PVD, CVD, e-beam evaporation, or other suitable process.

Figure 2:
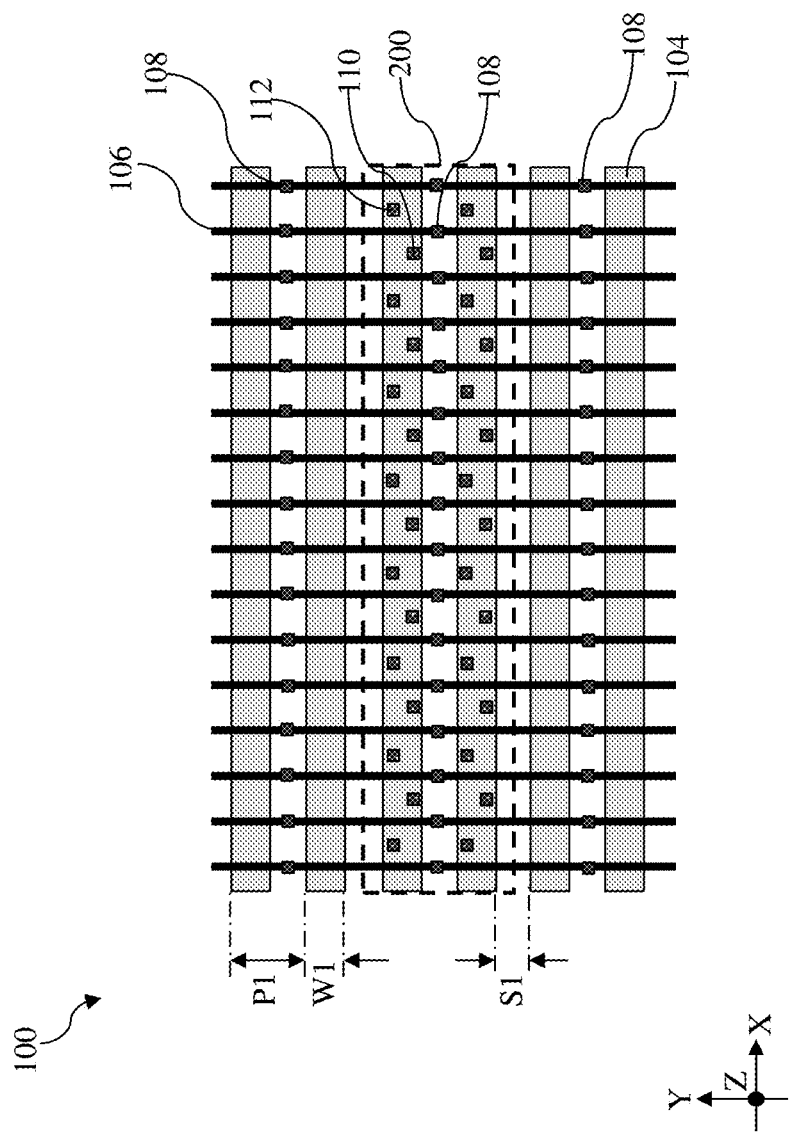
FIG. 2 illustrates a top layout view of a semiconductor workpiece having gate contact vias and source/drain contact vias, according to various aspects of the present disclosure.

The structure shown in FIG. 2 may be formed using a gate-last process or a replacement gate process. In an example gate-last process, polysilicon dummy gate stacks are first formed over channel regions of active regions. At least one gate spacer is then deposited over the dummy gate stacks before source/drain regions of the active regions 104 are recessed to form source/drain recesses. After formation of source/drain features in the source/drain recesses and deposition of an interlayer dielectric layer over the source/drain features, the dummy gate stacks are removed. When MBC devices are to be formed as in the depicted embodiments, sacrificial layers that interleave the nanostructures are selectively removed and gate structures are formed to wrap around each of the nanostructures. In alternative embodiments where finFETs are desired, the dummy gate stacks are replaced by gate structures 106 and the gate structures 106 wrap over the active regions 104.

Reference is still made to FIG. 1. The portions of the active regions 104 that are vertically overlapped by the gate structures 106 are channel regions while the portions adjacent the channel regions are source/drain regions. While not explicitly shown in FIG. 1, source/drain features are formed over the source/drain regions. That is, source/drain features are formed over source/drain regions on either side of the gate structures 106. The source/drain features may be n-type or p-type. N-type source/drain features may include silicon (Si) doped with an n-type dopant, such as phosphorus (P) or arsenic (As). P-type source/drain features may include silicon germanium (Si) doped with a p-type dopant, such as boron (B) or boron difluoride ($BF_2$).

An analog standard cell 200 is shown in FIG. 1. The analog standard cell 200 includes two active regions 104 that extend along the X direction. The analog standard cell 200 is constructed based on an analog standard cell template according to the present disclosure. The Y-direction boundaries of the analog standard cell 200 lie in the middle of the space between two active regions 104. As shown in FIG. 1, the analog standard cell 200 includes a cell height C that is equal to the sum of two times of the first width W1 (2×W1) and two times of the first spacing S1 (2×S1). The cell height C is also equal to two times of the first pitch P1 (2×P1).

Referring to FIG. 2, the workpiece 100 includes gate contact vias 108, source contact vias 110, and drain contact vias 112. As shown in FIG. 2, the gate contact vias 108 are disposed directly over and electrically coupled to the gate structures 106. In some instances, when a gate structure 106 is shorted to a source, alternative gate contact vias 108 may be formed. Source contact vias 110 and drain contact vias 112 come in pairs. A source feature and a drain feature in each pair are disposed on two sides of a gate structure 106 and are offset from one another along the Y direction. Moreover, the source contact vias 110 and the drain contact vias 112 are disposed directly over the active regions 104. The gate contact vias 108, source contact vias 110, and drain contact vias 112 may include titanium nitride (TiN), tungsten (W), cobalt (Co), or other suitable metal.

Figure 3:
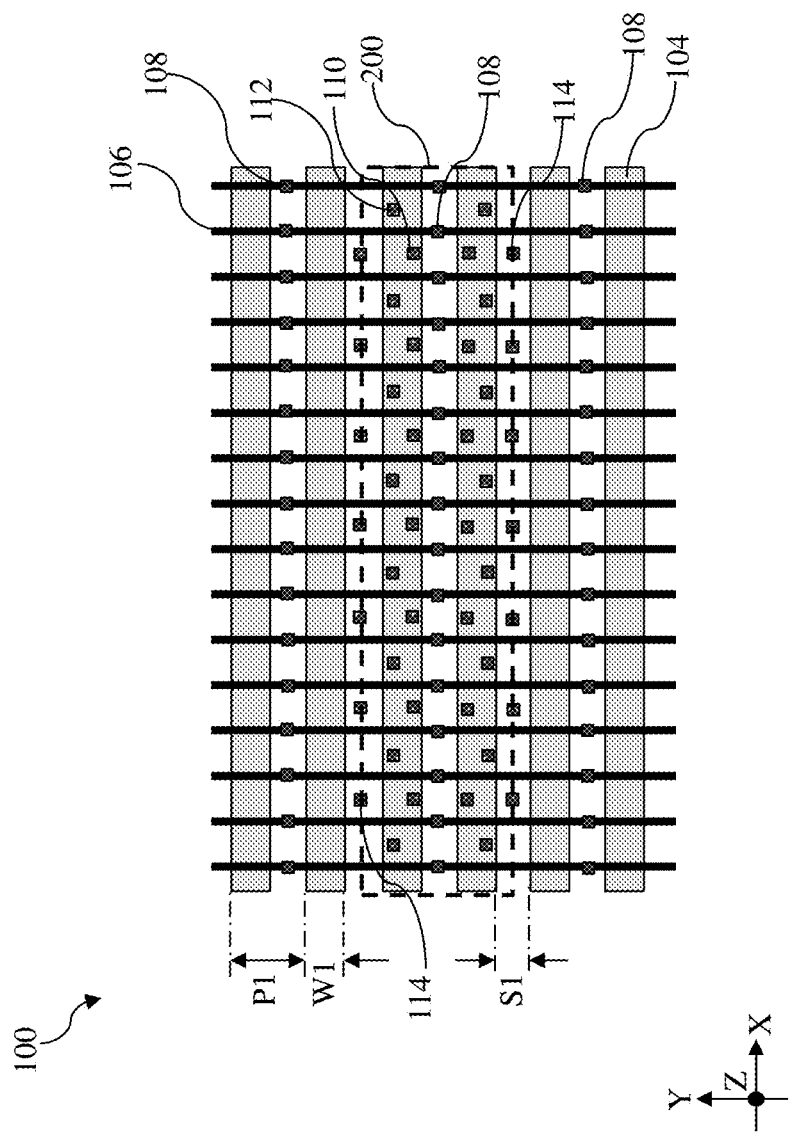
FIG. 3 illustrates a top layout view of a semiconductor workpiece having gate contact vias and source/drain contact vias, according to various aspects of the present disclosure.

In some alternative embodiments shown in FIG. 3, the analog standard cell 200 may also include power rail contact vias 114. Each of the power rail contact vias 114 is aligned with a source contact via 110 along the Y direction. The power rail contact vias 114 are arranged along the X direction to track the X-direction boundaries of the analog standard cell 200. As their name suggests, the power rail contact vias 114 provide a vertical conduction path of power rails in the first metal layer.

Figure 4:
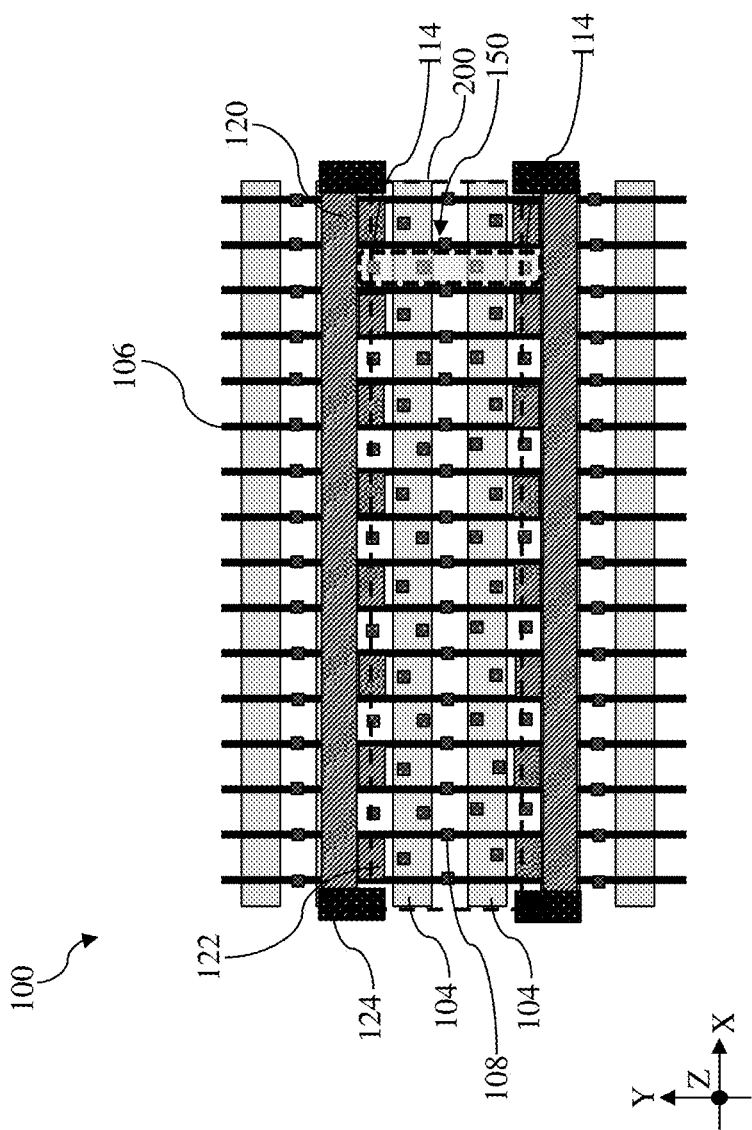
FIG. 4 illustrates a top layout view of a semiconductor workpiece having cut source/drain contact features, according to various aspects of the present disclosure.

To reduce parasitic capacitance, only source/drain contacts (source contacts in the depicted embodiments) that are coupled to the power rail contact vias 114 are allowed to extend beyond the two active regions 104 in the analog standard cell 200. To achieve this, source/drain contact cut features 120 and 122 may be formed. While the long source/drain contact cut features 120 extend continuously over several gate structures 106, the short source/drain contact cut features 122 that are sandwiched between two gate structures 106 selectively trim the source/drain contacts that are not coupled the power rail contact vias 114. The short source/drain contact cut features 122 functions to reduce the overlap between trimmed source/drain contacts with the adjacent gate structures 106, thereby reducing the parasitic capacitance. As shown in FIG. 4, due to the lack of short source/drain contact cut features 122, a source contact 150 is allowed to extend below a power rail contact via 114 and connect thereto. In order to divide power rails (to be described below) into segments, line cut features 124 may be formed, shown in FIG. 4. The source/drain contact cut features 120 and 122 as well as the line cut features 124 may include silicon oxide, silicon nitride, silicon oxynitride, silicon carbonitride, silicon oxycarbonitride, or a combination thereof.

Figure 5:
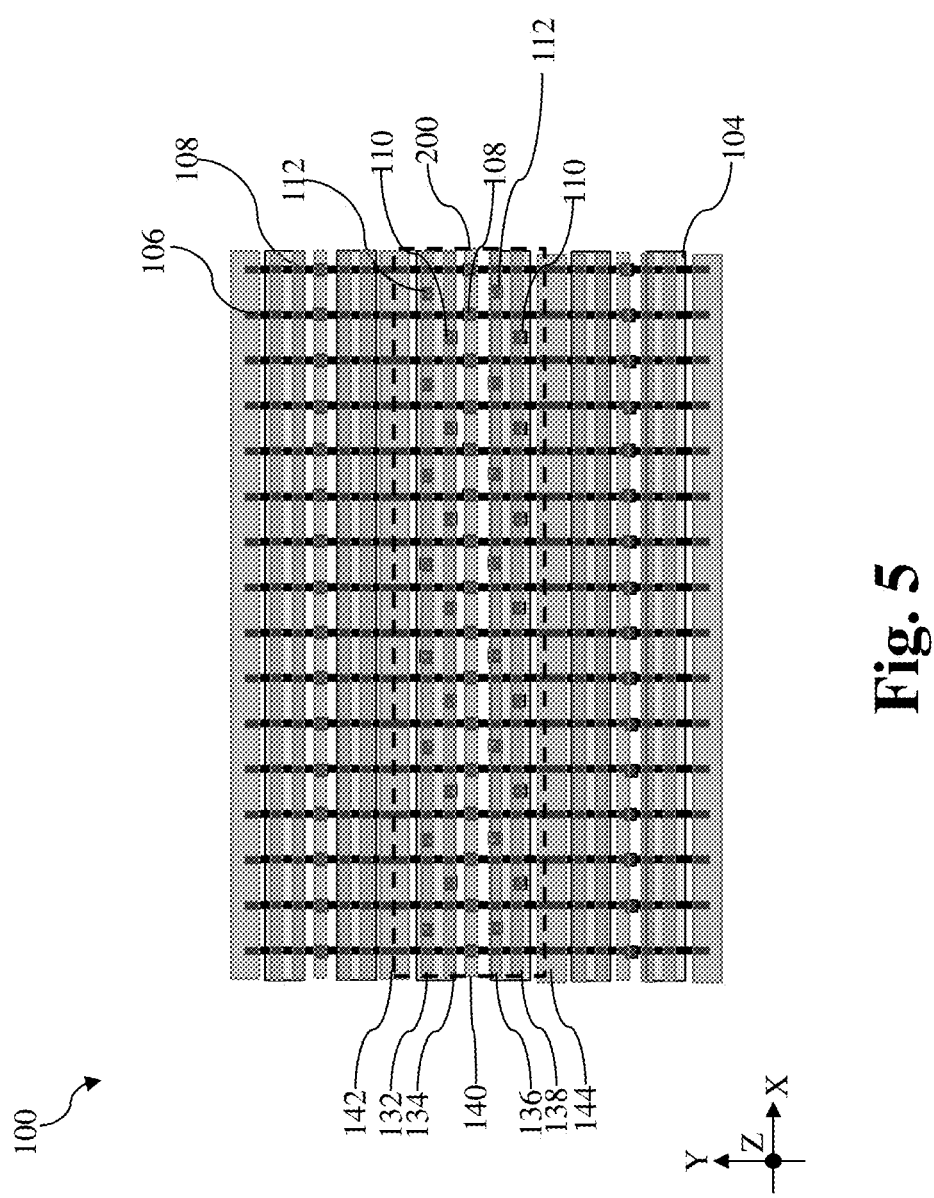
FIG. 5 illustrates a top layout view of a semiconductor workpiece having a first metal layer, according to various aspects of the present disclosure.

Referring to FIG. 5, a first metal layer (M0) is formed over the active regions 104, gate structures 106, gate contact vias 108, source contact vias 110, drain contact vias 112. The first metal layer (M0) includes a plurality of first conductive lines 132, a plurality of second conductive lines 134, a plurality of third conductive lines 136, a plurality of fourth conductive lines 138, a plurality of middle conductive lines 140 each disposed between a second conductive line 134 and a third conductive line 136. The first metal layer (M0) also includes a first power rail 142 and a second power rail 144. The first power rail 142 is spaced apart from the middle conductive line 140 by one first conductive line 132 and one second conductive line 134. The second power rail 144 is spaced apart from the middle conductive line 140 by one third conductive line 136 and one fourth conductive line 138. As shown in FIG. 5, the analog standard cell 200 includes one first conductive line 132, one second conductive line 134, one middle conductive line 140, one third conductive line 136, and one fourth conductive line 138. In the interest of the analog standard cell 200 serving as a repeated unit, only one half of the first power rail 142 and one half of the second power rail 144 are considered part of the analog standard cell 200. The aforementioned conductive lines and power rails in the first metal layer (M0) all extend along the X direction and are parallel with one another.

In some embodiments represented in FIG. 5, with respect to the active region 104 directly below the first conductive line 132, each of the drain contact vias 112 vertically couples a drain feature to the first conductive line 132 and each of the source contact vias 110 couples a source feature to the second conductive line 134. Each of the gate contact vias 108 is not disposed directly over any of the active regions 104. Each of the gate contact vias 108 couples a gate structure 106 to the middle conductive line. With respect to the active region 104 directly below the third conductive line 136, each of the drain contact vias 112 vertically couples a drain feature to the third conductive line 136 and each of the source contact vias 110 couples a source feature to the fourth conductive line 138. It can be seen that the first conductive line 132 electrically connect all the drain contact vias 112 together and that the second conductive line 134 electrically connect all the source contact vias 110 together. Similarly, the third conductive line 136 electrically connect all the drain contact vias 112 together and the fourth conductive line 138 electrically connect all the source contact vias 110 together.

While an analog standard cell that includes more conductive lines may perform similar functions, the analog standard cell 200 in FIG. 5 strikes a unique balance among functionality and performance. The analog standard cell 200 includes two parallel active regions 104. Every intersection between an active region 104 and a gate structure 106 may form a transistor that has a source and a drain. One conductive line is needed to string all the sources together and another conductive line is needed to string all the drains together. This is why two conductive lines overlie each of the two active regions 104. To space gate contact vias 108 apart from adjacent source contact vias 110 and drain contact vias 112 to reduce parasitic capacitance, the majority of the gate structures 106 are coupled to the middle conductive line 140 that is disposed between the second conductive line 134 and the third conductive line 136. While it is possible to include two middle conductive lines or more than two conductive lines over each of the active regions 104, the additional conductive lines and contact vias may lead to cell height increase or increase of parasitic capacitance. In the embodiments represented in FIG. 5, the first power rail 142 and the second power rail 144 are not utilized.

Figure 6:
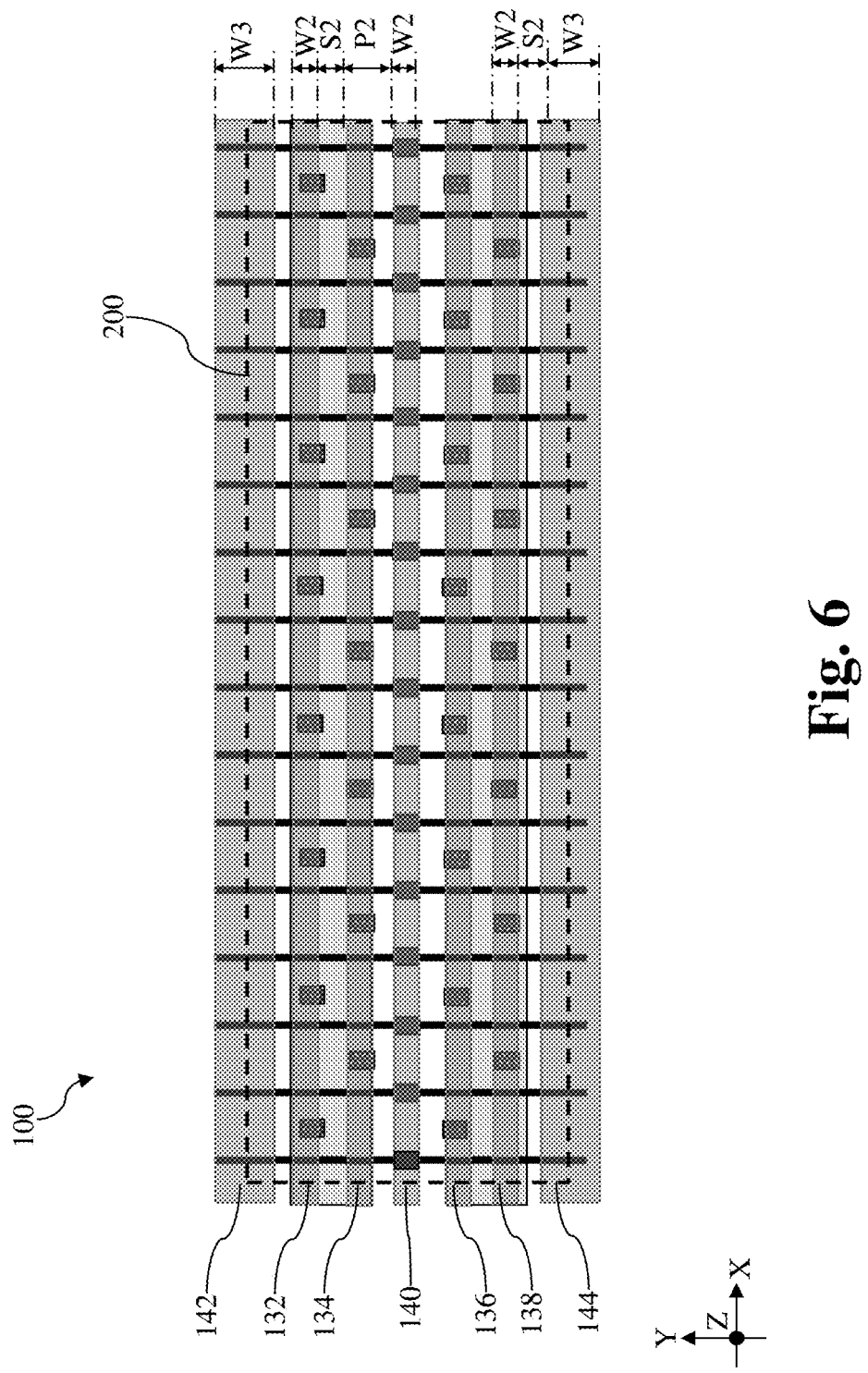
FIG. 6 illustrates an enlarged top view of analog standard cell in FIG. 5, according to various aspects of the present disclosure.

Reference is made to FIG. 6, which includes an enlarged top layout view of the analog standard cell 200 in FIG. 5. In the depicted embodiments, the first conductive line 132, the second conductive line 134, the middle conductive line 140, the third conductive line 136, and the fourth conductive line 138 share a second width W2 along the Y direction and are disposed at a second pitch P2. Each of the first conductive line 132, the second conductive line 134, the middle conductive line 140, the third conductive line 136, and the fourth conductive line 138 is spaced apart from one another by a second spacing S2. In some instances, the second width W2 is between about 10 nm and 15 nm and the second spacing S2 is between about 8 nm and 12 nm. A ratio of the second width W2 to the second spacing S2 may be between about 1.2 and about 1.5. The second pitch P2 is equal to the sum of the second width W2 and the second spacing S2. In some instances, the second pitch P2 may be between about 18 nm and about 28. The disclosed range of the ratio is unique. When the ratio is smaller than 1.2, the parasitic resistance caused by the narrower conductive lines may become a performance bottleneck. When the ratio is greater than 1.5, the close proximity of the conductive lines may result in increased parasitic capacitance that slows the device down. Each of the first power rail 142 and the second power rail 144 includes a third width W3 along the Y direction. In some instances, the third width W3 may be between about 20 nm and about 50 nm. In some implementations, a ratio of the third width W3 to the second width W2 may be between about 2 and about 3. When this ratio is below 2, the reduction of resistance may be enough to justify the incorporation of the power rails. When this ratio exceeds 3, the resulting cell height increase may outweigh the benefits of reduced resistance.

Figure 7:
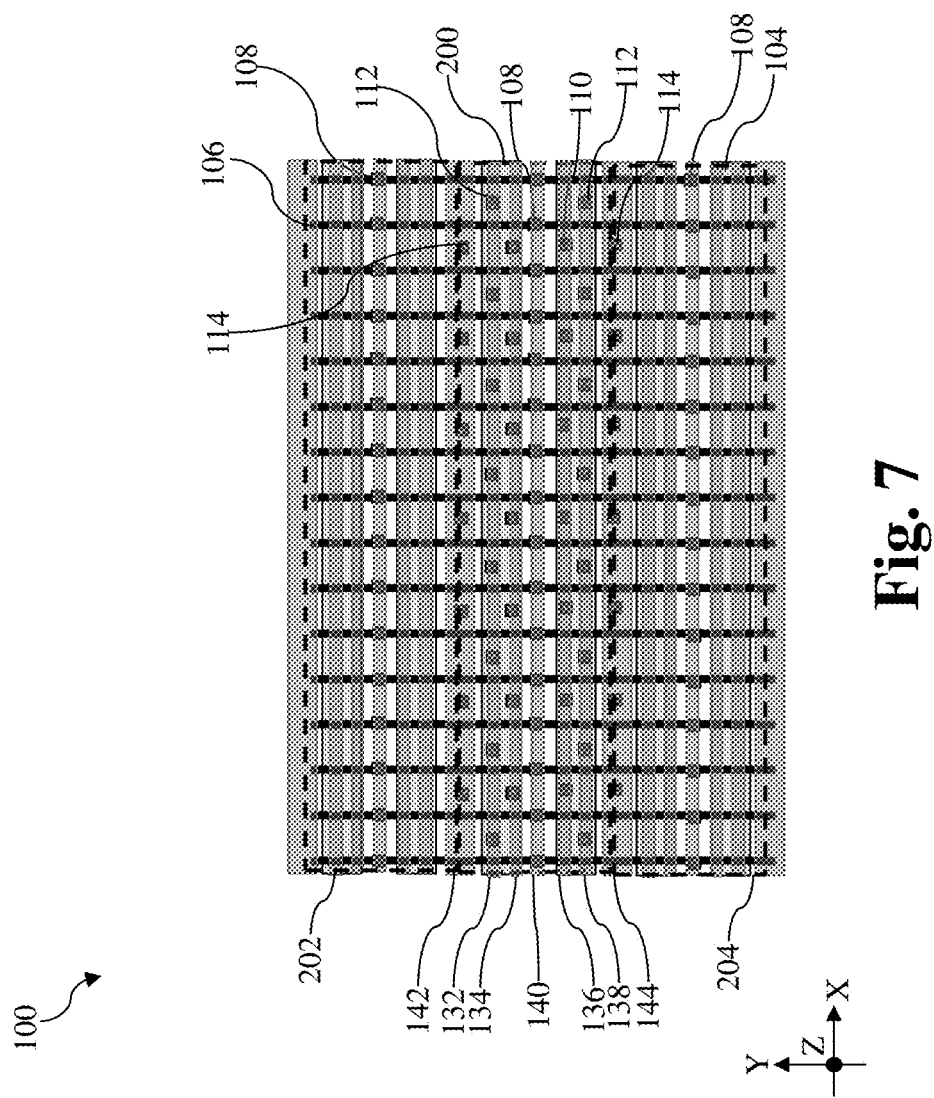
FIG. 7 illustrates a top layout view of a semiconductor workpiece having a first metal layer, according to various aspects of the present disclosure.

FIG. 7 illustrates a workpiece 100 where the first power rail 142 and the second power rail 144 are utilized to carry source signals. In the analog standard cell 200 shown in FIG. 7, power rail contact vias 114 are formed to couple the source features to the first power rail 142 and the second power rail 144 to reduce resistance. Different from the analog standard cell 200 shown in FIG. 5, the source contact vias 110 and the drain contact vias 112 on one side of the middle conductive line 140 is a mirror image of the source contact vias 110 and the drain contact vias 112 on the other side of the middle conductive line 140. This mirror symmetry is now present in FIG. 7. FIG. 7 also illustrates dummy standard cells 202 and 204. The dummy standard cells 202 and 204 serve as isolation structures and may not have all the features of the analog standard cell 200. That said, each of the dummy standard cells 202 and 204 is generated based on the analog standard cell template and may at least include two active regions, a first conductive line, a second conductive line, a middle conductive line, a third conductive line, a fourth conductive line, a first power rail, and the second power rail, as shown in FIG. 7.

Figure 8:
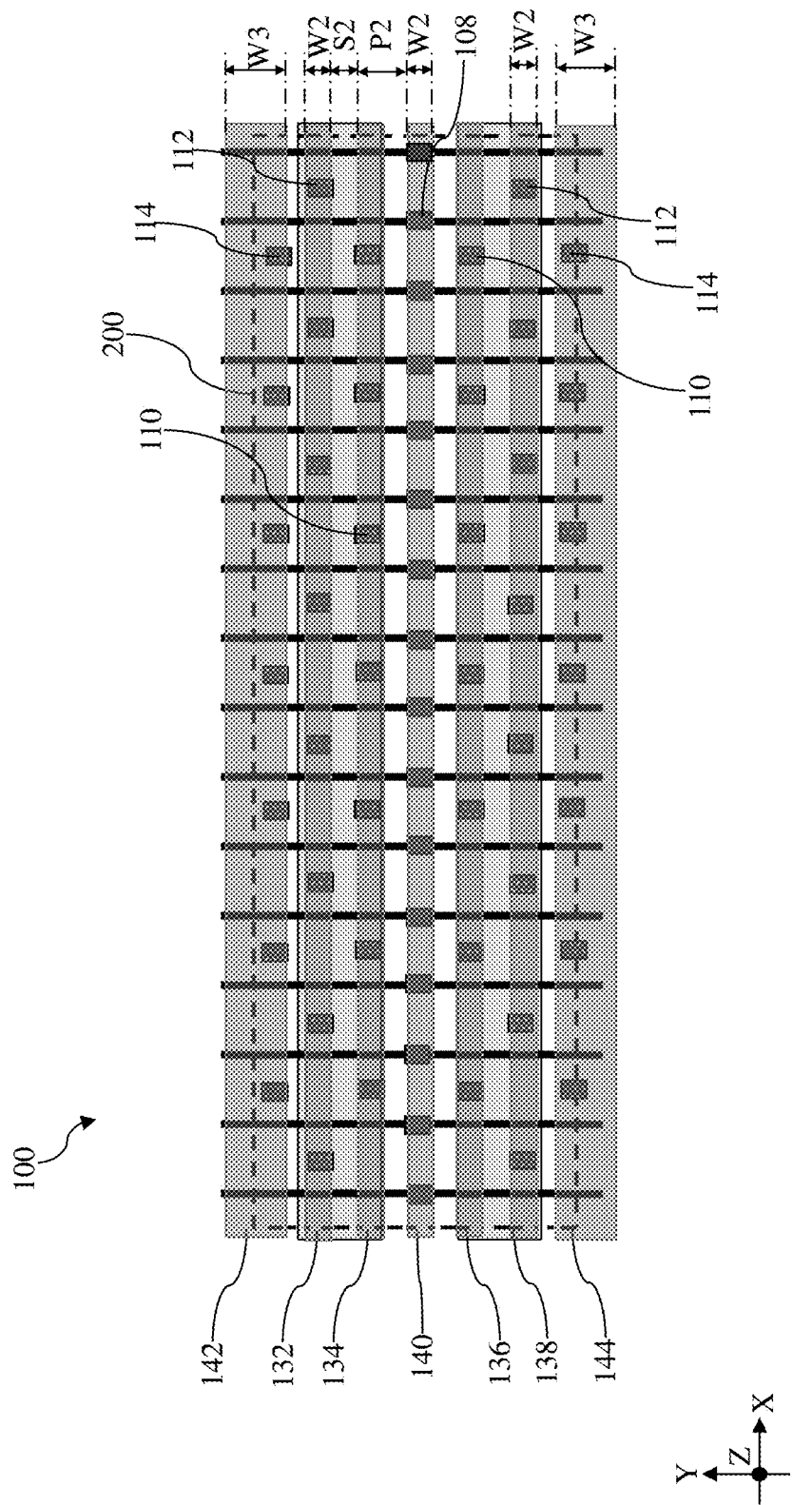
FIG. 8 illustrates an enlarged top view of analog standard cell in FIG. 7, according to various aspects of the present disclosure.

Reference is made to FIG. 8, which includes an enlarged top layout view of the analog standard cell 200 in FIG. 7. In the depicted embodiments, the first conductive line 132, the second conductive line 134, the middle conductive line 140, the third conductive line 136, and the fourth conductive line 138 share a second width W2 along the Y direction and are disposed at a second pitch P2. Each of the first conductive line 132, the second conductive line 134, the middle conductive line 140, the third conductive line 136, and the fourth conductive line 138 is spaced apart from one another by a second spacing S2. In some instances, the second width W2 is between about 10 nm and 15 nm and the second spacing S2 is between about 8 nm and 12 nm. A ratio of the second width W2 to the second spacing S2 may be between about 1.2 and about 1.5. The second pitch P2 is equal to the sum of the second width W2 and the second spacing S2. In some instances, the second pitch P2 may be between about 18 nm and about 28. The disclosed range of the ratio is unique. When the ratio is smaller than 1.2, the parasitic resistance caused by the narrower conductive lines may become a performance bottleneck. When the ratio is greater than 1.5, the close proximity of the conductive lines may result in increased parasitic capacitance that slows the device down. Each of the first power rail 142 and the second power rail 144 includes a third width W3 along the Y direction. In some instances, the third width W3 may be between about 20 nm and about 30. In some implementations, a ratio of the third width W3 to the second width W2 may be between about 2 and about 3. When this ratio is below 2, the reduction of resistance may be enough to justify the incorporation of the power rails. When this ratio exceeds 3, the resulting cell height increase may outweigh the benefits of reduced resistance.

Figure 9:
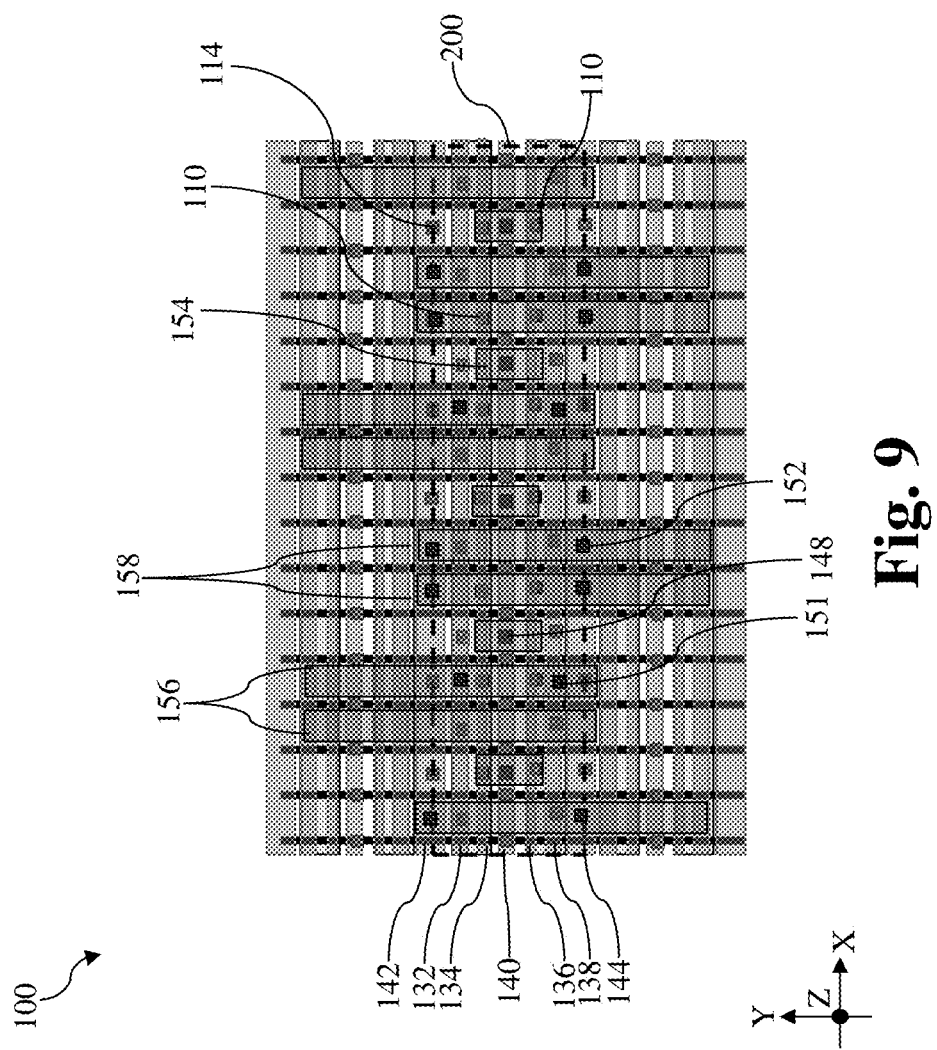
FIG. 9 illustrates a top layout view of a semiconductor workpiece having a second metal layer, according to various aspects of the present disclosure.

FIG. 9 illustrates a second metal layer (M1) disposed over the first metal layer (Mo) illustrated in FIG. 7. In the depicted embodiments, the second metal layer (M1) includes gate contact islets 154, pairs of drain signal lines 156 and pairs of source signal lines 158. As shown in FIG. 9, each of the gate contact islets 154 is electrically coupled to the underlying middle conductive line 140 by way of a contact via 148. The drain signal lines 156 come in pairs and are electrically coupled to the underlying first conductive line 132 and fourth conductive line 138 by ways of contact vias 151. In the depicted embodiment, one of the two drain signal lines 156 in a pair is not electrically coupled to any underlying lines to reduce parasitic capacitance, even though the resistance may increase as well. In this instance, it is observed that the benefits of reducing capacitance outweigh the adverse effect of the resistance increase. In some alternative embodiments, both of the two drain signal lines 156 are electrically coupled to underlying conductive lines to carry drain signals. The source signal lines 158 also come in pairs and are electrically coupled the underlying first power rail 142 and the second power rail 144 by way of contact vias 152. The gate contact islets 154 are intentionally truncated along the Y direction to reduce the parasitic capacitance between itself and adjacent source signal line 158 or drain signal line 156. In some embodiments, along the Y direction, each of the gate contact islets 154 has a length between about 2 times of the second pitch P2 (shown in FIGS. 6 and 8) and about 3 times of the second pitch P2. In other words, the length of a gate contact islet 154 may be between about 35 nm and about 85 nm. This range is not trivial. When the length of the gate contact islet 154 is smaller than 35 nm, the gate contact islet 154 may become difficult to form due to photolithography limitations. In some instances, photolithography radiation source for back-end-of-line (BEOL) patterning may have a wavelength at around 248 nm. When the length of the gate contact islet 154 is greater than 84 nm, the cost associated with the line cutting process may outweigh the benefits from capacitance reduction.

The design that the drain signal lines 156 and the source signal lines 158 come in side-by-side pairs are not trivial either. Simulation results show that by having the drain signal lines 156 and source signal lines 158 in pairs can reduce the capacitance between source signal lines 158 and drain signal lines 156. The close proximity of two drain signal lines 156 or two source signal lines 158 do not increase the parasitic capacitance as they carry the same signal. This pairing-up arrangement may be referred to as "same-potential grouping." Additionally, as shown in FIG. 9, while the two drain signal lines 156 or the two source signal lines 158 in each pair are coterminous along the Y direction, the drain signal line pairs and the source signal line pairs are shifted along the Y direction. In the depicted embodiment, the drain signal line pairs are offset upward in FIG. 9 while the source signal line pairs are shifted downward in FIG. 9. This offset arrangement further reduces the capacitance between source signal lines 158 and drain signal lines 156. FIG. 9 also illustrates the boundaries of the analog standard cell 200.

Figure 10:
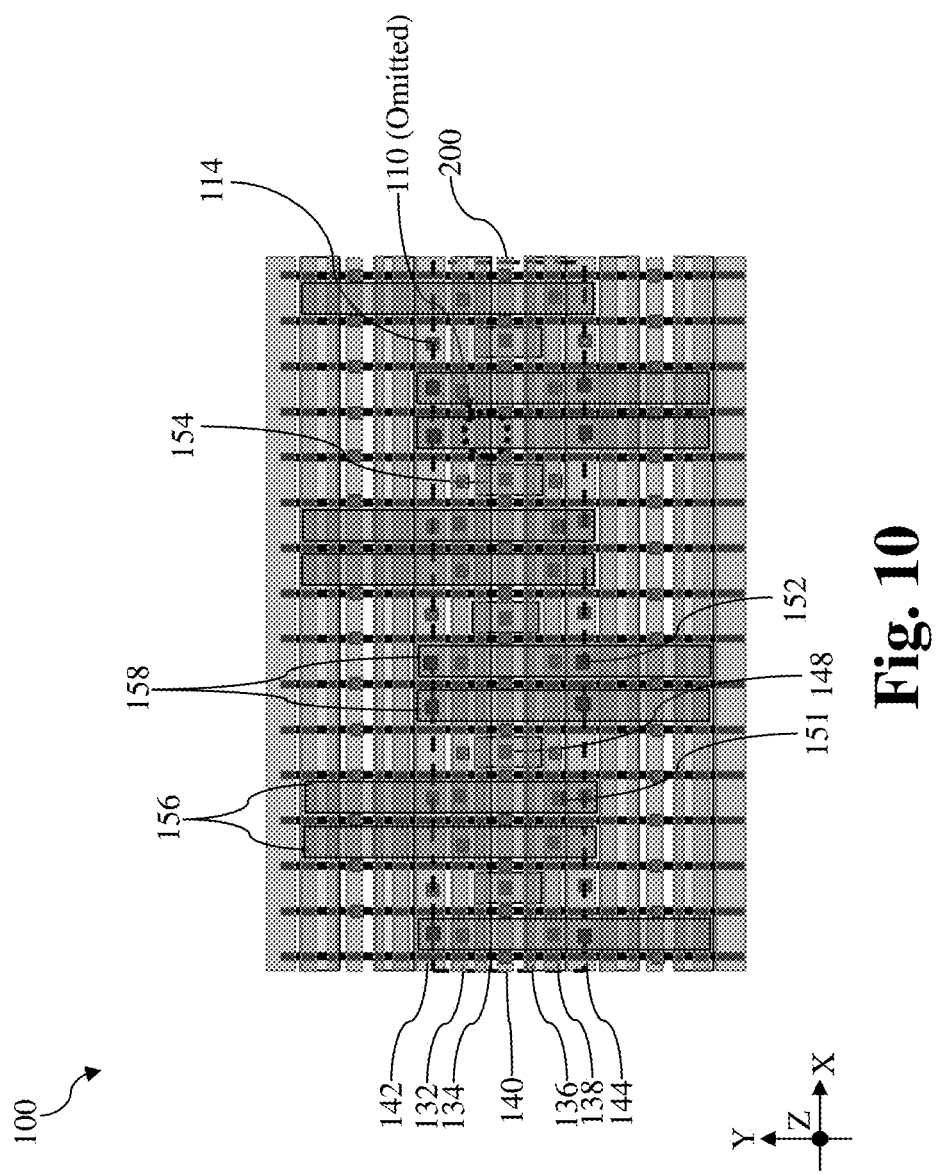
FIG. 10 illustrates a top layout view of a semiconductor workpiece having a second metal layer, according to various aspects of the present disclosure.

Reference is made to FIG. 10, which illustrates an alternative embodiment where the source contact vias 110 are omitted from the embodiment shown in FIG. 9. As both the power rail contact vias 114 and the source contact vias 110 carry source signals, the source contact vias 110 may be omitted entirely to reduce parasitic capacitance. In this embodiment, the second conductive line 134 and the third conductive line 136 may become electrically floating as they are no longer electrically coupled to any contact vias. FIG. 10 also illustrates the boundaries of the analog standard cell 200.

Figure 11:
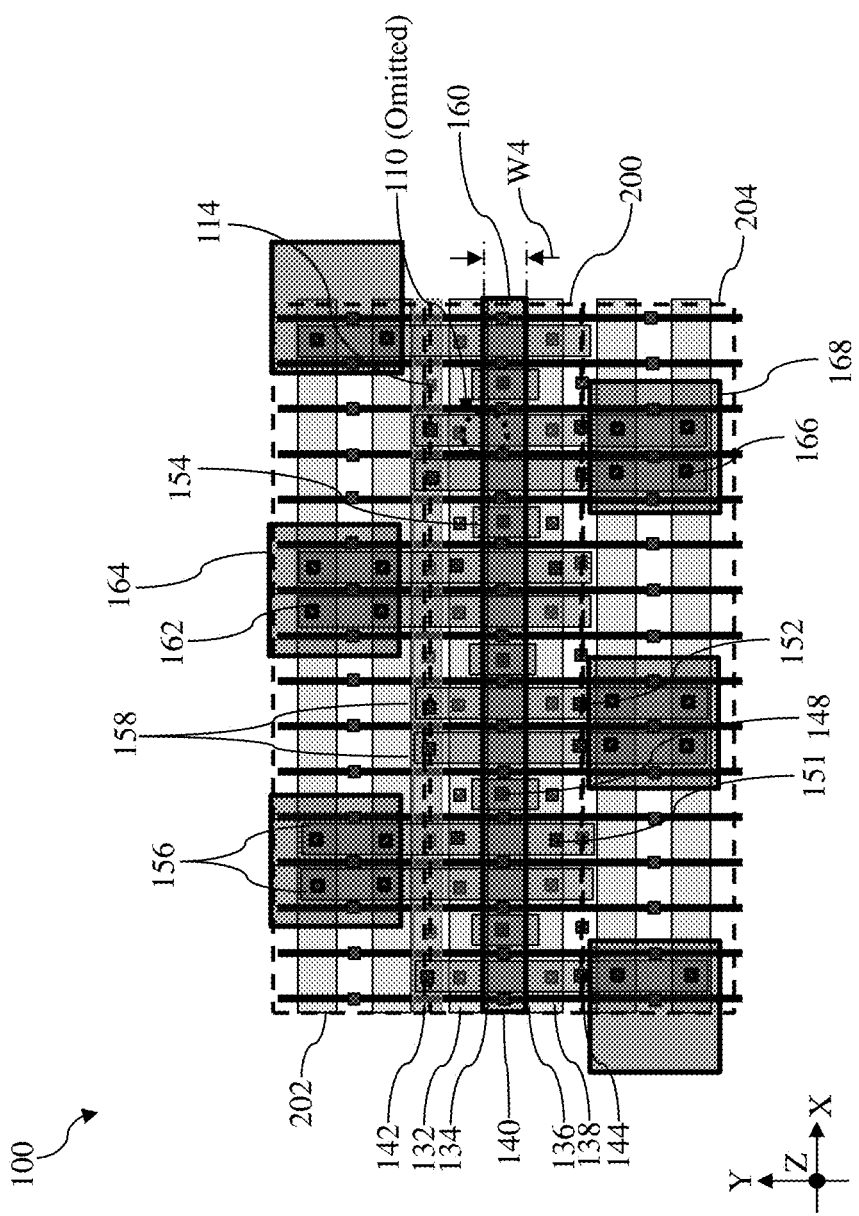
FIG. 11 illustrates a top layout view of a semiconductor workpiece having a third metal layer, according to various aspects of the present disclosure.

Referring to FIG. 11, which illustrates a third metal layer (M2) disposed over the second metal layer (M1) shown in FIG. 10. For clarity of illustration, features in the first metal layer (MO) are omitted from FIG. 11. As shown in FIG. 11, the third metal layer (M2) include a gate signal line 160, drain contact islands 164 and source contact islands 168. The gate signal line 160 that is situated directly over the middle conductive line 140 (omitted) and the gate contact islets 154. The gate signal line 160 is electrically coupled to the gate contact islets 154 by way of contact vias, which are not separately labeled as they may substantially overlap with contact via 148. The gate signal line 160 has a fourth width W4 along the Y direction. The fourth width W4 is greater than the second width W2 of the middle conductive line 140. In some instances, the fourth width W4 may be between about 20 nm and about 60 nm. Each of the drain contact islands 164 is electrically coupled to a pair of drain signal lines 156 by way of contact vias 162. These drain contact islands 164 are made possible by the "same-potential grouping" technique and the drain contact islands 164 are not strung together in the third metal layer (M2) to reduce parasitic capacitance increases. In the depicted embodiment, each of the drain signal lines 156 is coupled to an overlying drain contact island 164 by two contact vias 162. Similarly, each of the source contact islands 168 is electrically coupled to a pair of source signal lines 158 by way of contact vias 166. Like the drain contact islands 164, each of the source contact islands 168 is disposed directly over a pair of source signal lines 158 to which it connects and the source contact islands 168 are not connected together at the third metal layer (M2) to reduce parasitic capacitance. In the depicted embodiment, each of the source signal lines 158 is coupled to an overlying source contact island 168 by two contact vias 166. In terms of cell boundaries, the gate signal line 160 falls within the boundaries of the analog standard cell 200 while the drain contact islands 164 and the source contact islands 168 fall within the boundaries of the dummy standard cells 202 and 204, respectively.

As described above with respect to various embodiments of the analog standard cell 200, an analog standard cell template according to the present disclosure may include, on the device level, two active regions 104 disposed side-by-side and a plurality of gate structures 106 that wrap over or around the active regions 104. In a first metal layer (M0) over the active regions 104 and the gate structures 106, the analog standard cell 200 includes a first power rail 142, a first conductive line 132, a second conductive line 134, a middle conductive line 140, a third conductive line 136, a fourth conductive line 138, and a second power rail 144. The middle conductive line 140 is coupled to the majority of the gate structures 106 by gate contact vias 108. The first conductive line 132 and the second conductive line 134 are disposed directly over the one of two active regions 104. The third conductive line 136 and the fourth conductive line 138 are disposed directly over the other of the two active regions 104. Out of the two conductive lines disposed directly over an active region 104, one is coupled to the source features by way of source contact vias 110 and the other is coupled to the drain features by way of drain contact vias 112. A second metal layer of the analog standard cell template includes pairs of drain signal lines 156, pairs of source signal lines 158, and gate contact islets 154. As described above, different contact via arrangements may be implemented to utilize the power rails or to reduce parasitic capacitance. A third metal layer of the analog standard cell template may include a gate signal line 160, drain contact islands 164, or the source contact islands 168 depending on where the standard cell is situated.

Figure 12:
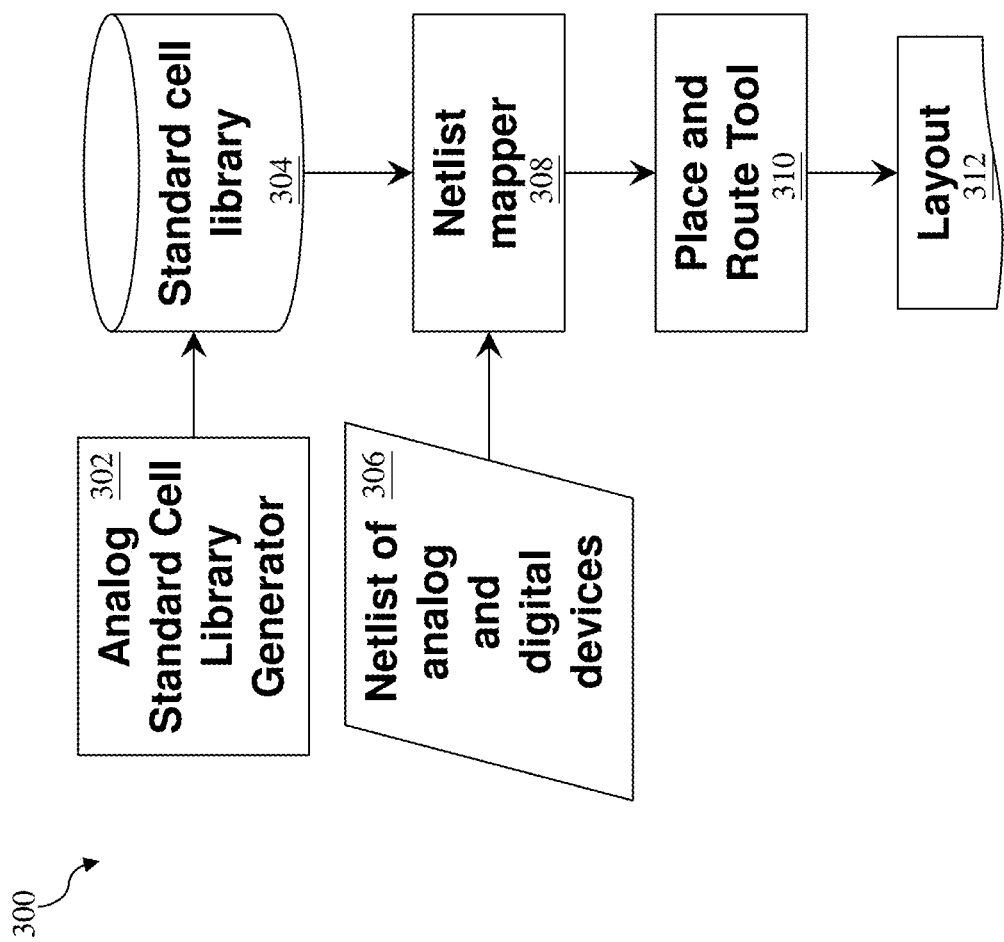
FIG. 12 illustrates a schematic block diagram of a system for generating and placing analog standard cells, according to various aspects of the present disclosure.

Reference is finally made to FIG. 12, which illustrates a system 300 for generating a layout of an integrated circuit device that includes analog circuits. The system 300 may include an analog standard cell library generator 302, a standard cell library 304, a netlist 306 of analog and digital devices, a netlist mapper 308, a place and route tool 310. As shown in FIG. 12, the standard cell library 304 may store multiple digital standard cells and multiple analog standard cell. When the standard cell library 304 does not include a desired analog standard cell. The analog standard cell library generator 302 may generate a desired analog standard cell based on the analog standard cell template of the present disclosure. The generated analog standard cell is then stored in the standard cell library. A circuit design includes a netlist 306 of analog and digital devices. The netlist mapper 308 maps the digital and analog devices to standard cells in the standard cell library, which includes both analog standard cells and digital standard cells. After the mapping, the mapped standard cells include mapped analog standard cells and mapped digital standard cells. The place and route tool 310 then place the mapped standard cells in suitable location and generate routing to interconnect the mapped standard cells, thereby producing a layout 312 or a physical layout 312. As described above, the system 300 implements a method that generally track the functions of each system components in the system 300.

Although not intended to be limiting, analog standard cell templates of the present disclosure provide benefits. For example, power rails are situated in the first metal layer, closer to the front-end-of-line (FEOL) devices to reduce resistance. Drain signal lines and source signal lines come in pairs and offset from one another based on the same-potential grouping technique, so as to reduce parasitic capacitance. The same-potential grouping also results in unique source contact islands and drain contact islands in the third metal layer. These and several other features of the analog standard cell template reduce parasitic capacitance and improve performance of the analog standard cell. Additionally, the analog standard cell templates of the present disclosure are versatile and may be implemented to serve different functions.

In one exemplary aspect, the present disclosure is directed to an analog standard cell. The analog standard cell includes a first active region and a second active region extending side-by-side along a first direction, and a plurality of conductive lines in a first metal layer over the first active region and the second active region. The plurality of conductive lines includes a first conductive line and a second conductive line extending along the first direction and disposed directly over the first active region, a third conductive line and a fourth conductive line extending along the first direction and disposed directly over the second active region, a middle conductive line disposed between the second conductive line and the third conductive line, a first power line spaced apart from the middle conductive line by the first conductive line and the second conductive line, and a second power line spaced apart from the middle conductive line by the third conductive line and the fourth conductive line.

In some embodiments, the middle conductive line is not directly over any of the first active region and the second active region. In some implementations, the first power line and the second power line are not directly over any of the first active region and the second active region. In some instances, the first conductive line, the second conductive line, the middle conductive line, the third conductive line, and the fourth conductive line are of a first width along a second direction perpendicular to the first direction, the first power line and the second power line are of a second width along the second direction, and the second width is greater than the first width. In some embodiments, a ratio of the second width to the first width is between about 2 and 3. In some implementations, the analog standard cell may further include a source/drain feature disposed over the first active region. A portion of the source/drain feature is directly below the first power line. In some implementations, the analog standard cell may further include a plurality of gate structures extending along a second direction perpendicular to the first direction. Each of the plurality of gate structures wraps over the first active region and the second active region. In some instances, the analog standard cell may further include a gate contact via electrically coupling at least one of the plurality of gate structures to the middle conductive line. In some instances, the analog standard cell may further include a second metal layer disposed over the first metal layer. The second metal layer includes a plurality of gate contact islets extending along a second direction perpendicular to the first direction, a plurality pairs of drain signal lines extending along the second direction, and a plurality pairs of source signal lines extending along the second direction. The plurality pairs of drain signal lines are offset with respect to the plurality pairs of source signal lines along the second direction. In some embodiments, a length of each of the plurality of gate contact islets along the second direction is smaller than a length of each of the plurality pairs of drain signal lines along the second direction.

In another exemplary aspect, the present disclosure is directed to a system. The system includes a standard cell library generator that generates analog standard cells, a standard cell library to store the analog standard cells, a netlist mapper that maps analog devices in a netlist to the analog standard cells in the standard cell library, and a place-and-route tool that places and routes the mapped analog devices to optimize a layout for the netlist. Each of the analog standard cells includes a first active region and a second active region extending side-by-side along a first direction, and a plurality of conductive lines in a first metal layer over the first active region and the second active region. The plurality of conductive lines includes a first conductive line and a second conductive line extending along the first direction and disposed directly over the first active region, a third conductive line and a fourth conductive line extending along the first direction and disposed directly over the second active region, a middle conductive line disposed between the second conductive line and the third conductive line, a first power line spaced apart from the middle conductive line by the first conductive line and the second conductive line, and a second power line spaced apart from the middle conductive line by the third conductive line and the fourth conductive line.

In some embodiments, the middle conductive line is not directly over any of the first active region and the second active region. In some implementations, the first power line and the second power line are not directly over any of the first active region and the second active region. In some embodiments, the first conductive line, the second conductive line, the middle conductive line, the third conductive line, and the fourth conductive line are of a first width along a second direction perpendicular to the first direction, the first power line and the second power line are of a second width along the second direction, and the second width is greater than the first width. In some implementations, a ratio of the second width to the first width is between about 2 and 3. In some instances, each of the analog standard cells further includes a second metal layer disposed over the first metal layer. The second metal layer includes a plurality of gate contact islets extending along a second direction perpendicular to the first direction, a plurality pairs of drain signal lines extending along the second direction, and a plurality pairs of source signal lines extending along the second direction. The plurality pairs of drain signal lines are offset with respect to the plurality pairs of source signal lines along the second direction. In some embodiments, a length of each of the plurality of gate contact islets along the second direction is smaller than a length of each of the plurality pairs of drain signal lines along the second direction.

In yet another exemplary aspect, the present disclosure is directed to a method. The method includes generating analog standard cells based on an analog standard cell template, storing generated analog standard cells in a standard cell library, mapping analog devices in a netlist to the analog standard cells in the standard cell library, and placing and routing the mapped analog devices to optimize a layout for the netlist. The analog standard cell template includes a first active region and a second active region extending side-by-side along a first direction, and a plurality of conductive lines in a first metal layer over the first active region and the second active region. The plurality of conductive lines includes a first conductive line and a second conductive line extending along the first direction and disposed directly over the first active region, a third conductive line and a fourth conductive line extending along the first direction and disposed directly over the second active region, a middle conductive line disposed between the second conductive line and the third conductive line, a first power line spaced apart from the middle conductive line by the first conductive line and the second conductive line, and a second power line spaced apart from the middle conductive line by the third conductive line and the fourth conductive line.

In some embodiments, the middle conductive line is not directly over any of the first active region and the second active region. In some implementations, the analog standard cell template further includes a plurality of gate structures extending along a second direction perpendicular to the first direction. At least one of the plurality of gate structures is electrically coupled to the middle conductive line.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. An analog standard cell fabricated on a substrate, comprising:
    a first active region and a second active region extending side-by-side along a first direction; and
    a plurality of conductive lines in a first metal layer over the first active region and the second active region, the plurality of conductive lines comprising:
        a first conductive line and a second conductive line extending along the first direction and disposed directly over the first active region,
        a third conductive line and a fourth conductive line extending along the first direction and disposed directly over the second active region,
        a middle conductive line disposed between the second conductive line and the third conductive line,
        a first power line spaced apart from the middle conductive line by the first conductive line and the second conductive line, and
        a second power line spaced apart from the middle conductive line by the third conductive line and the fourth conductive line.

2. The analog standard cell of claim 1, wherein the middle conductive line is not directly over any of the first active region and the second active region.

3. The analog standard cell of claim 1, wherein the first power line and the second power line are not directly over any of the first active region and the second active region.

4. The analog standard cell of claim 1,
    wherein the first conductive line, the second conductive line, the middle conductive line, the third conductive line, and the fourth conductive line are of a first width along a second direction perpendicular to the first direction,
    wherein the first power line and the second power line are of a second width along the second direction,
    wherein the second width is greater than the first width.

5. The analog standard cell of claim 4, wherein a ratio of the second width to the first width is between about 2 and 3.

6. The analog standard cell of claim 1, further comprising:
    a source/drain feature disposed over the first active region,
    wherein a portion of the source/drain feature is directly below the first power line.

7. The analog standard cell of claim 1, further comprising:
a plurality of gate structures extending along a second direction perpendicular to the first direction,
wherein each of the plurality of gate structures wraps over the first active region and the second active region.

8. The analog standard cell of claim 7, further comprising:
a gate contact via electrically coupling at least one of the plurality of gate structures to the middle conductive line.

9. The analog standard cell of claim 1, further comprising:
a second metal layer disposed over the first metal layer, the second metal layer comprising:
a plurality of gate contact islets extending along a second direction perpendicular to the first direction,
a plurality pairs of drain signal lines extending along the second direction, and
a plurality pairs of source signal lines extending along the second direction,
wherein the plurality pairs of drain signal lines are offset with respect to the plurality pairs of source signal lines along the second direction.

10. The analog standard cell of claim 9, wherein a length of each of the plurality of gate contact islets along the second direction is smaller than a length of each of the plurality pairs of drain signal lines along the second direction.

11. A semiconductor device, comprising:
a semiconductor substrate;
a first fin-shaped active region and a second fin-shaped active region over the semiconductor substrate and extending in parallel along a first direction;
a plurality of gate structures over channel regions of the first fin-shaped active region and the second fin-shaped active region and extending in parallel along a second direction perpendicular to the first direction; and
a first interconnect layer disposed over the first fin-shaped active region, the second fin-shaped active region, and the plurality of gate structures, the first interconnect layer comprising:
a first conductive line and a second conductive line extending along the first direction and electrically coupled to source/drain regions of the first fin-shaped active region,
a third conductive line and a fourth conductive line extending along the first direction and electrically coupled to source/drain regions of the second fin-shaped active region, and
a middle conductive line disposed between the second conductive line and the third conductive line and electrically coupled to the plurality of gate structures.

12. The semiconductor device of claim 11, wherein the first interconnect layer further comprises:
a first power line spaced apart from the middle conductive line by the first conductive line and the second conductive line; and
a second power line spaced apart from the middle conductive line by the third conductive line and the fourth conductive line.

13. The semiconductor device of claim 12,
wherein the first conductive line, the second conductive line, the middle conductive line, the third conductive line, and the fourth conductive line are of a first width along the second direction,
wherein the first power line and the second power line are of a second width along the second direction,
wherein the second width is greater than the first width.

14. The semiconductor device of claim 13, wherein a ratio of the second width to the first width is between about 2 and 3.

15. The semiconductor device of claim 11, further comprising:
a second interconnect layer disposed over the first interconnect layer and comprising:
a plurality of gate contact islets extending along the second direction,
a plurality pairs of drain signal lines extending along the second direction, and
a plurality pairs of source signal lines extending along the second direction,
wherein the plurality pairs of drain signal lines are offset with respect to the plurality pairs of source signal lines along the second direction.

16. The semiconductor device of claim 15, wherein a length of each of the plurality of gate contact islets along the second direction is smaller than a length of each of the plurality pairs of drain signal lines along the second direction.

17. A semiconductor device, comprising:
a substrate;
a first active region and a second active region over the substrate and extending in parallel along a first direction;
a plurality of gate structures over channel regions of the first active region and the second active region and extending in parallel along a second direction perpendicular to the first direction; and
a first interconnect layer disposed over the first active region, the second active region, and the plurality of gate structures, the first interconnect layer comprising:
a first conductive line extending along the first direction and electrically coupled to drain regions of the first active region by way of a first plurality of drain contact vias,
a second conductive line extending along the first direction and electrically coupled to source regions of the first active region by way of a first plurality of source contact vias,
a third conductive line extending along the first direction and electrically coupled to source regions of the second active region by way of a second plurality of source contact vias,
a fourth conductive line extending along the first direction and electrically coupled to drain regions of the second active region by way of a second plurality of drain contact vias, and
a middle conductive line disposed between the second conductive line and the third conductive line and electrically coupled to the plurality of gate structures by way of a plurality of gate contact vias.

18. The semiconductor device of claim 17, wherein the substrate, the first active region and the second active region comprise silicon.

19. The semiconductor device of claim 17, further comprising:
a second interconnect layer disposed over the first interconnect layer and comprising:
a plurality of gate contact islets extending along the second direction and electrically coupled to the middle conductive line in the first interconnect layer,
a plurality pairs of drain signal lines extending along the second direction, and
a plurality pairs of source signal lines extending along the second direction, wherein the plurality pairs of drain signal lines are offset with respect to the plurality pairs of source signal lines along the second direction.

20. The semiconductor device of claim 19, further comprising:
- a third interconnect layer disposed over the second interconnect layer and comprising:
  - a plurality of drain contact islands, each of the plurality of drain contact islands being in electrical contact with one of the plurality pairs of drain signal lines; and
  - a plurality of source contact islands, each of the plurality of source contact islands being in electrical contact with one of the plurality pairs of source signal lines.

* * * * *